(12) United States Patent
Imai et al.

(10) Patent No.: US 10,710,198 B2
(45) Date of Patent: Jul. 14, 2020

(54) LASER PROCESSING DEVICE AND LASER PROCESSING METHOD

(71) Applicant: AMADA HOLDINGS CO., LTD., Kanagawa (JP)

(72) Inventors: Norio Imai, Kanagawa (JP); Hiroshi Takano, Kanagawa (JP); Takahiro Shibata, Kanagawa (JP); Ko Nakamura, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/093,035

(22) PCT Filed: Apr. 13, 2017

(86) PCT No.: PCT/JP2017/015075
§ 371 (c)(1),
(2) Date: Oct. 11, 2018

(87) PCT Pub. No.: WO2017/179643
PCT Pub. Date: Oct. 19, 2017

(65) Prior Publication Data
US 2019/0118298 A1   Apr. 25, 2019

(30) Foreign Application Priority Data

Apr. 15, 2016 (JP) .................................. 2016-082050
Apr. 7, 2017 (JP) .................................. 2017-076866

(51) Int. Cl.
*B23K 26/28* (2014.01)
*B23K 26/38* (2014.01)
(Continued)

(52) U.S. Cl.
CPC .......... *B23K 26/28* (2013.01); *B23K 26/0884* (2013.01); *B23K 26/244* (2015.10);
(Continued)

(58) Field of Classification Search
None
See application file for complete search history.

(56) References Cited

U.S. PATENT DOCUMENTS

| 3,790,744 | A | * | 2/1974 | Bowen | ................... | B23K 26/40 |
| | | | | | | 219/121.69 |
| 2012/0312481 | A1 | * | 12/2012 | Kang | ................... | B29C 63/0013 |
| | | | | | | 156/715 |

(Continued)

FOREIGN PATENT DOCUMENTS

| JP | 7-241688 | 9/1995 |
| JP | 2001-212681 | 8/2001 |

(Continued)

OTHER PUBLICATIONS

European Search Report dated Apr. 4, 2019 in European Patent Application No. 17782456.2.

(Continued)

*Primary Examiner* — Matthew J Daniels
*Assistant Examiner* — Mohammad M Ameen
(74) *Attorney, Agent, or Firm* — Greenblum & Bernstein, P.L.C.

(57) ABSTRACT

Provided is a laser processing device that performs laser processing on a workpiece to which a protective film has been attached, wherein a determination is made as to whether or not a common part for which laser marking processing is necessary for cutting the protective film is present on the basis of processing information including a processing program, and when a common part for which laser marking processing is necessary for cutting the protective film is present, the laser marking processing process for that common part is added to the processing program.

9 Claims, 10 Drawing Sheets

(51) Int. Cl.
*B23K 26/361* (2014.01)
*B23K 26/244* (2014.01)
*B23K 26/60* (2014.01)
*B23K 26/08* (2014.01)
*B23K 26/362* (2014.01)
*B23K 101/34* (2006.01)
*B23K 101/18* (2006.01)

(52) U.S. Cl.
CPC .......... *B23K 26/361* (2015.10); *B23K 26/362* (2013.01); *B23K 26/38* (2013.01); *B23K 26/60* (2015.10); *B23K 2101/18* (2018.08); *B23K 2101/34* (2018.08)

(56) References Cited

U.S. PATENT DOCUMENTS

2013/0082038 A1* 4/2013 Yoshikawa ......... H01L 21/3043
219/121.81
2014/0048519 A1* 2/2014 Gadd .................. B23K 26/16
219/121.68
2014/0064308 A1* 3/2014 Mysliwitz ............ B41J 2/442
372/25

FOREIGN PATENT DOCUMENTS

| JP | 2010-194602 | 9/2010 |
| JP | 2013-022608 | 2/2013 |
| JP | 2014-97519 | 5/2014 |
| JP | 2015-104739 | 6/2015 |

OTHER PUBLICATIONS

Official Communication issued in International Bureau of WIPO Patent Application No. PCT/JP2017/015075, dated Jul. 11, 2017, along with an english translation thereof.

Official Communication issued in Japan Patent Application No. 2017-076866, dated Jun. 30, 2017, along with an english translation thereof.

* cited by examiner

FIG. 7

Butt Joint Feature
├── Local Edge.ID = 1
│       ├── GeomAttr1 = Flange Edge
│       └── GeomAttr2 = Flange Edge
├── Local Edge.ID = 2
│       ├── GeomAttr1 = Thickness Edge
│       └── GeomAttr2 = Thickness Edge
├── Local Edge.ID = 3
│       ├── GeomAttr1 = Flange Edge
│       └── GeomAttr2 = Flange Edge
├── Local Edge.ID = 4
│       ├── GeomAttr1 = Thickness Face
│       └── GeomAttr2 = Thickness Edge
├── Direction
└── Clearance = 0.3

(a)

(b)

(a)

(b)

LASER PROCESSING DEVICE AND LASER PROCESSING METHOD

TECHNICAL FIELD

The present invention relates to a laser processing device and a laser processing method that, when processing a workpiece to which a protective film is attached, automatically cut the protective film at a part such as a common part where components come into contact with each other and the protective film must be taken off.

BACKGROUND ART

In recent years, a required quality for a manufacturing process of sheet metal products is getting more, as a result workpiece processing carried out in a state that a protective film is attached to a workpiece such as a stainless material is increased.

In a process of sheet metal laser processing, there is a part such as a common part where components come into contact with each other and a protective film must be removed. Conventionally, manual work has been carried out to conduct the partial removal of the protective film.

Here, the case that requires a protective film to be partly removed from a workpiece is a case involving a component to which another component is scheduled to be attached, a case involving a component to be hidden by hemming (pressing) bending, or a case involving a part to be burned by welding heat.

PRIOR ART DOCUMENT

Patent Literature

Patent Literature 1: Japanese Unexamined Patent Application Publication No. 2015-104739

SUMMARY OF THE INVENTION

The conventional manual protective film partial removing work partly removes the film, lifts it, and cuts it with a cutter knife or the like so as not to damage a mother material. This causes problems such as taking a long time and increasing labor of a worker.

In consideration of the above-mentioned circumstances, an object of the present invention is to provide a laser processing device and a laser processing method, capable of, when laser processing a workpiece attached with a protective film, automatically determining and cutting the protective film at a part such as a common part where components come into contact with each other and the protective film must be removed, thereby improving workability of the partial removal of the protective film.

The present invention is to solve the problems mentioned above, and a feature of the present invention is that a laser processing device carries out laser processing on a workpiece attached with the protective film, wherein based on processing information including a processing program, whether or not there is a common part that requires laser processing to cut the protective film is determined, and when there is the common part that requires the laser processing to cut the protective film, a laser processing process for the common part that requires the laser processing to cut the protective film is added to the processing program.

Another feature of the present invention is that the laser processing to cut the protective film is laser marking processing.

Another feature of the present invention is that the common part that requires the laser processing to cut the protective film is a part to which another component is scheduled to be attached.

Another feature of the present invention is that the common part that requires the laser processing to cut the protective film is a part on which hemming (pressing) bending is carried out.

Another feature of the present invention is that the common part that requires the laser processing to cut the protective film is a part on which welding is carried out.

Another feature of the present invention is that the common part that requires the laser processing to cut the protective film is a part to which a stud bolt is attached by welding.

Another feature of the present invention is that the processing information includes, in addition to the processing program, information necessary for processing such as a material, processing dimensions, and 3D model information of the workpiece to process, as well as processing process information after laser processing of the workpiece W such as welding setting and stud bolt attachment setting and information concerning the protective film attached to the workpiece W, the information concerning the protective film including the type of the protective film.

Another feature of the present invention is that a laser processing method for carrying out laser processing on a workpiece attached with the protective, comprising a step of determining, based on processing information including a processing program, whether or not there is a common part that requires laser processing to cut the protective film, and a step of adding to the processing program a laser processing process for the common part that requires the laser processing to cut the protective film when there is the common part that requires the laser processing to cut the protective film.

Another feature of the present invention is that, when the common part that requires the laser processing to cut the protective film is a common part on which welding is carried out, the shape of the common part that requires the laser processing to cut the protective film is adjusted according to a heat diffusing range from a weld line.

Another feature of the present invention is that, when the common part that requires the laser processing to cut the protective film is a common part on which welding is carried out, the shape of the common part that requires the laser processing to cut the protective film is changed according to an irradiation direction of a laser beam from a welding head.

BRIEF DESCRIPTION OF DRAWINGS

FIG. 7 is an explanatory diagram of configuration information of the common face shown in FIG. 6.

DESCRIPTION OF EMBODIMENTS

Hereunder, an embodiment according to the present invention will be explained with reference to the drawings.

Figure 1:
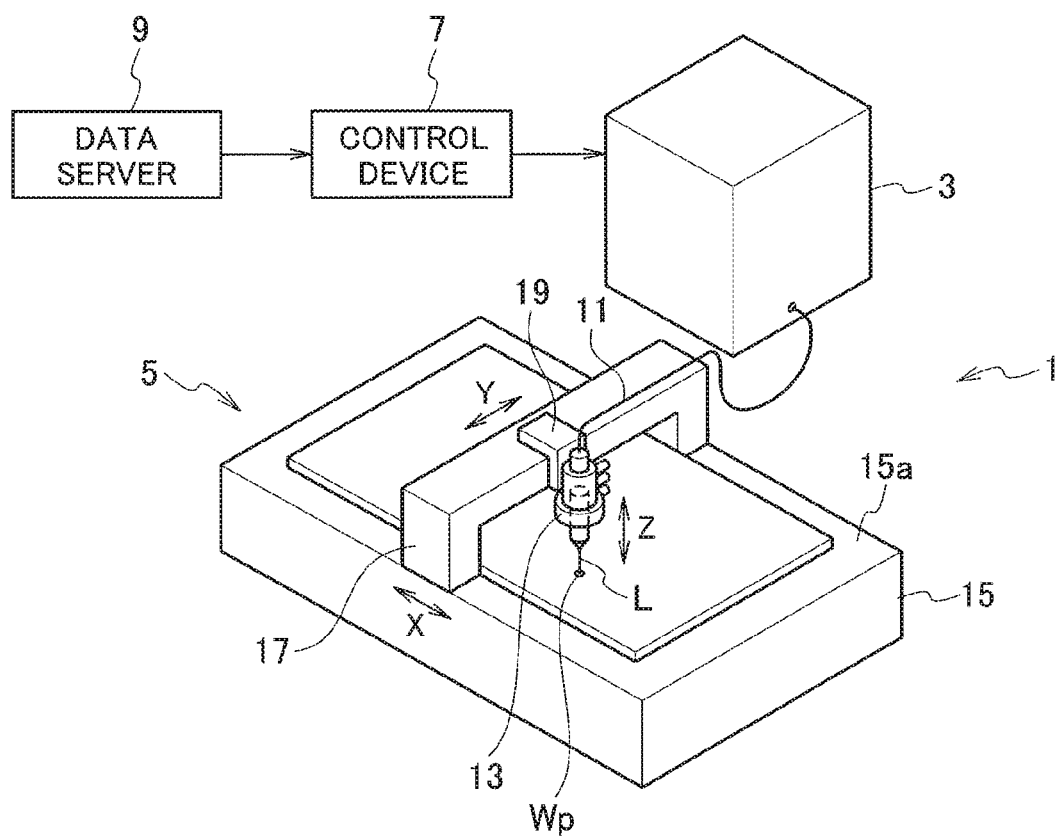
FIG. 1 is a general perspective diagram of a laser processing device according to an embodiment of the present invention.

FIG. 1 is a general perspective diagram of a laser processing device according to the embodiment of the present invention.

As shown in FIG. 1, the laser processing device 1 emits a laser beam to a workpiece W that is a material to process, carries out laser processing such as opening a hole on the workpiece W, and produces a predetermined component or the like from the workpiece W.

The laser processing device 1 has a laser oscillator 3 as a laser light source, a main body unit 5 to irradiate the workpiece W with a laser beam outputted from the laser oscillator 3 and process the workpiece W, and a control device 7 to control an overall operation of the laser processing device 1. To the control device 7, an external data server 9 and the like are connected.

The laser oscillator 3 oscillates a laser beam in response to an instruction from the control device 7. The laser beam generated by the laser oscillator 3 is supplied through a process fiber 11 to a processing head 13.

The main body unit 5 has a processing table 15 having a mounting plane 15a on which the workpiece W is placed and an X-axis carriage 17 that is arranged on the processing table 15 and is moved in a direction (X-axis direction) along the mounting plane 15a.

On the X-axis carriage 17, a Y-axis carriage 19 is arranged to move along the mounting plane 15a in a Y-axis direction orthogonal to the X-axis direction. To the Y-axis carriage 19, the processing head 13 is attached to be movable in a Z-axis direction (a direction orthogonal to the X-axis and Y-axis).

The X-axis carriage 17, Y-axis carriage 19, and processing head 13 are set to be independently driven by drive units (not shown) under the control of the control device 7.

The processing head 13 is two-dimensionally movable through a cooperation of the X-axis carriage 17 and Y-axis carriage 19 along a surface of the workpiece W within a range facing the workpiece W, irradiates an intended processing point Wp of the workpiece W with a laser beam L having a predetermined focal position, and carries out processing.

Figure 2:
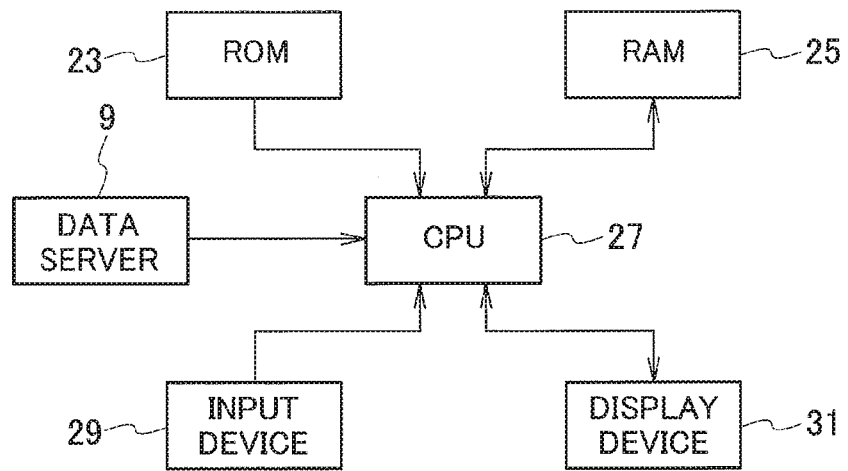
FIG. 2 is a schematic block diagram of a control device 7 shown in FIG. 1.

FIG. 2 is a schematic block diagram of the control device 7 shown in FIG. 1.

As shown in FIG. 2, the control device 7 consists of a computer having a CPU 27 to which a ROM 23 and a RAM 25 are connected. To the CPU 27, an input device 29 such as a keyboard, a display device 31 such as a display, the external data server 9, and the like are also connected.

Here, the control device 7 is supplied with processing information including a processing program from the external data server 9 and the like.

Here, the processing information includes, in addition to the processing program, information necessary for processing such as the material, processing dimensions, and 3D model information of the workpiece W to process, as well as processing process information after laser processing of the workpiece W such as welding setting and stud bolt attachment setting and information concerning a protective film attached to the workpiece W.

The information concerning the protective film includes the type of the protective film. As will be explained later, the control device 7 refers to the information necessary for processing, the processing process information after laser processing of the workpiece W such as welding setting and stud bolt attachment setting, and the information concerning the protective film attached to the workpiece W, to prepare information concerning a common part of a component to be produced from the workpiece W, and based on the information of the common part, controls laser marking processing to cut the protective film by laser processing.

Namely, the common part of a component is a part where components come into contact with each other after processing. On the common part where components come into contact with each other, the laser marking processing is carried out in advance so that the protective film may easily be taken off.

By the way, the above-mentioned information necessary for processing includes drawing information such as a development diagram. The laser marking processing cuts a protective film made of vinyl chloride or the like.

Namely, in the control device 7, the CPU 27 follows an instruction from an operator through the input device 29, to control the laser processing device 1 in accordance with the processing information including the processing program and carry out laser processing including the laser marking processing on the workpiece W.

Next, the laser marking processing executed by the control device 7 to cut a protective film will be explained. In this case, a determination whether or not there is a protective film is achieved in advance, and when there is a protective film, the process is carried out.

Figure 3:
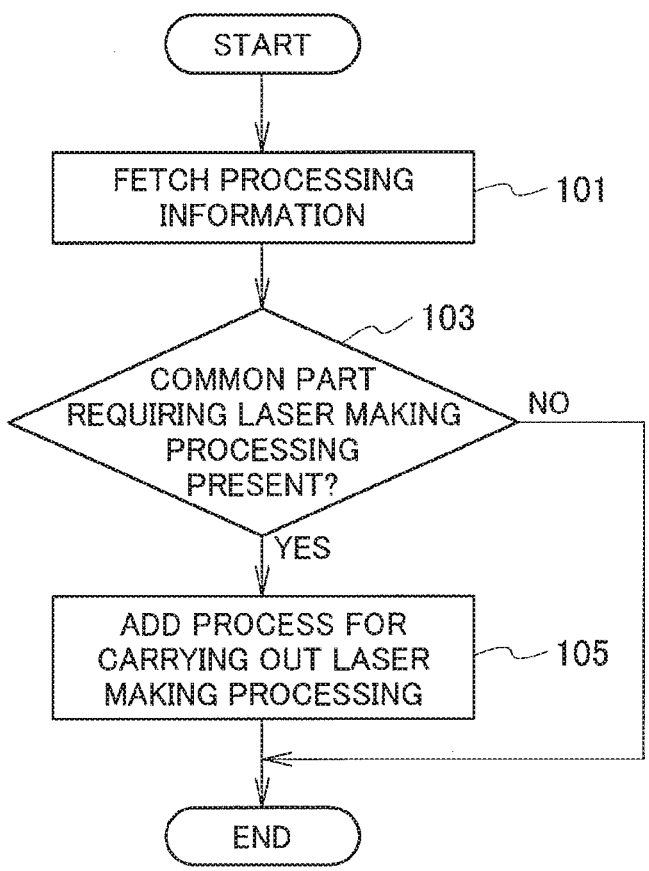
FIG. 3 is a flowchart of adding laser marking processing executed by the control device 7 to cut a protective film.

FIG. 3 is a flowchart executed by the control device 7 to add the laser marking processing to cut the protective film.

In a step 101 of FIG. 3, the control device 7 takes processing information including a processing program from the external data server 9 and the like.

Here, the processing information includes, in addition to the processing program, information necessary for processing such as the material, processing dimensions, and 3D model information of a workpiece W to process, as well as processing process information after laser processing of the workpiece W such as welding setting and stud bolt attachment setting and information concerning the protective film attached to the workpiece W, the information concerning the protective film including the type of the protective film.

Then, in a step 103, the control device 7 determines, based on the processing information, whether or not there is a common part that requires the laser marking processing to cut the protective film. When there is the common part that requires the laser marking processing to cut the protective film, the control device 7 adds in a step 105 a process of carrying out the laser marking processing along a periphery of the common part to the processing program.

Although the above-mentioned laser marking processing is set to be carried out after regular laser processing, it may be set to be carried out before the regular laser processing.

Next, the details of the above-mentioned steps 103 and 105 will be explained.

Figure 4:
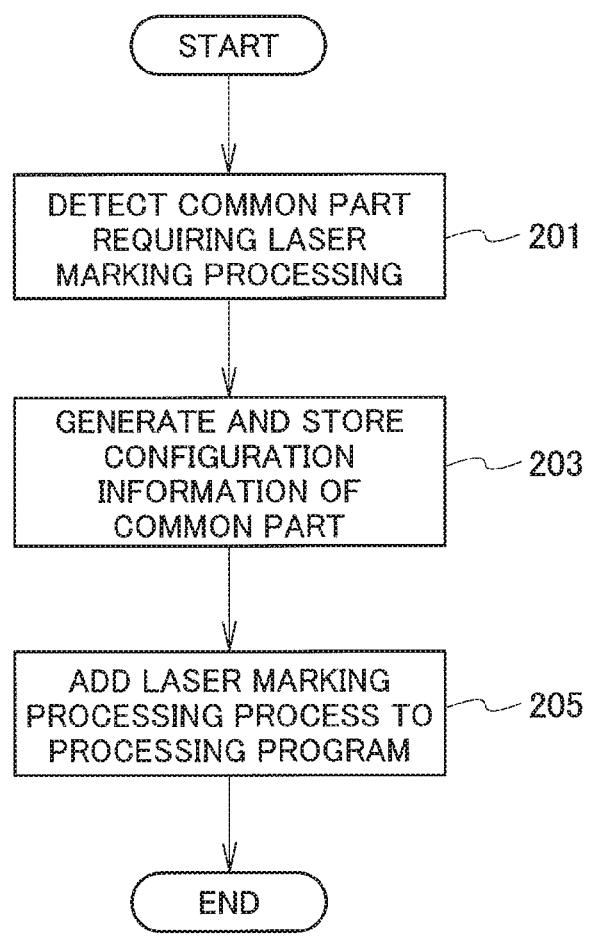
FIG. 4 is a flowchart of a process of a step 103 shown in FIG. 3 to determine whether or not there is a common part that requires the laser marking processing and a process of a step 105 to add a laser marking processing process to a processing program.

FIG. 4 is a flowchart of the step 103 to determine whether or not there is the common part that requires the laser marking processing and the step 105 to add the process of carrying out the laser marking processing to the processing program.

In a step 201 of FIG. 4, the control device 7 detects, based on the fetched processing information including the processing program, the common part that requires the laser marking processing to cut the protective film.

Namely, since the processing information includes, in addition to the processing program, the information necessary for processing such as the material, processing dimensions, and 3D model information of the workpiece W to process, as well as the processing process information after laser processing of the workpiece W such as welding setting and stud bolt attachment setting and the information concerning the protective film attached to the workpiece W, the control device 7 detects, based on the processing information, the common part where components come into contact with each other after processing and welding or the like is carried out.

Figure 5:
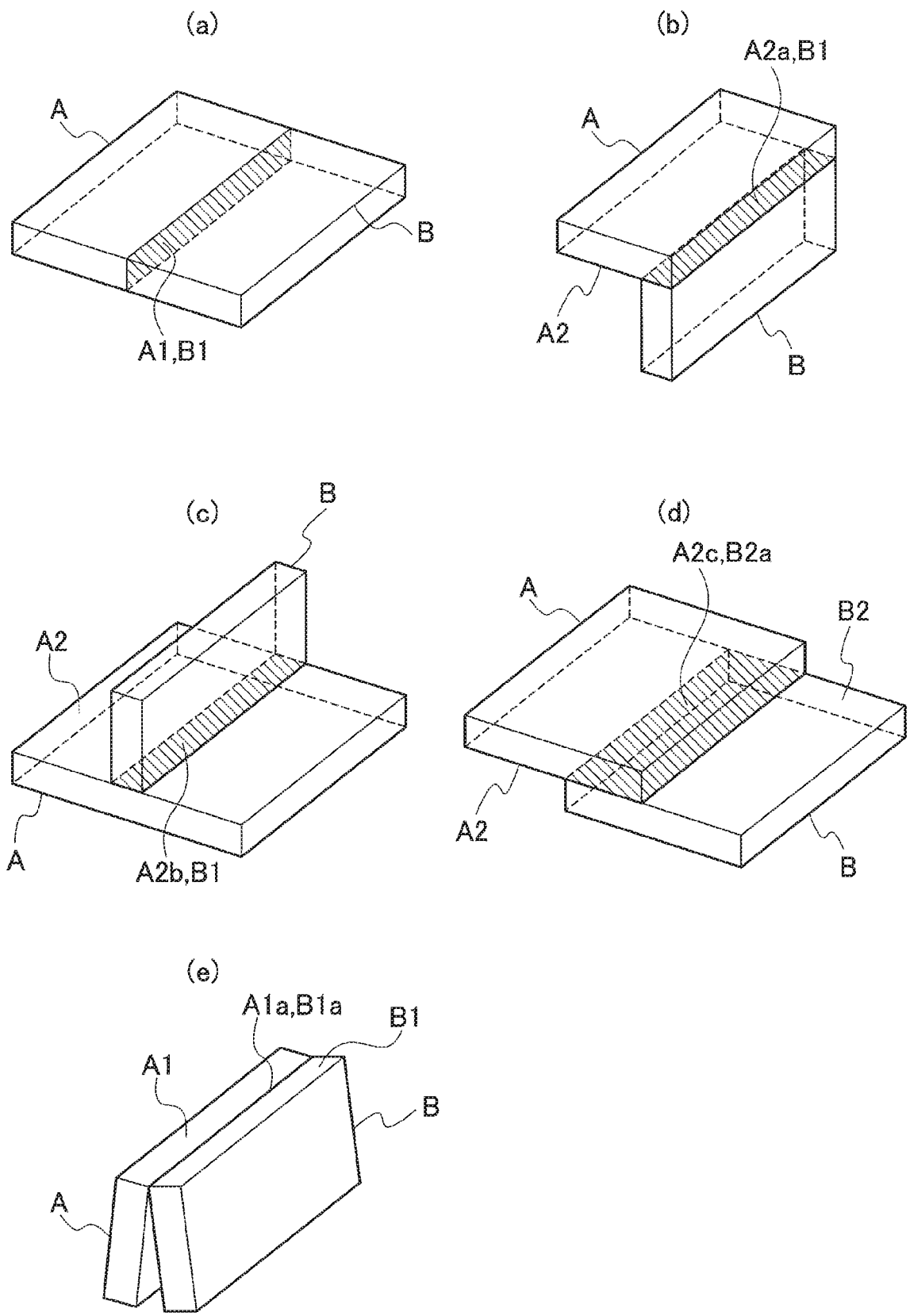
FIG. 5 is an explanatory diagram of the type of a common part where components come into contact with each other.

By the way, types of the common part where components come into contact with each other are as shown in FIG. 5. Namely, there are a butt joint shown in FIG. 5(a) in which an end face A1 of a component A and an end face B1 of a component B come into contact with each other to form a common part, a corner joint shown in FIG. 5(b) in which a corner part A2a of a flat face A2 of a component A and an end face B1 of a component B come into contact with each other to form a common part, a T-joint shown in FIG. 5(c) in which a central part A2b of a flat face A2 of a component A and an end face B1 of a component B come into contact with each other to form a common part, a lap joint shown in FIG. 5(d) in which a portion A2c of a flat face A2 of a component A and a portion B2a of a flat face B2 of a component B come into contact with each other to form a common part, and an edge joint shown in FIG. 5(e) in which an edge portion A1a of an end face A1 of a component A and an edge portion B1a of an end face B1 of a component B come into contact with each other to form a common part.

Next, in a step 203, the CPU 27 of the control device 7 generates, as a joint pattern, configuration information of the common part detected in the above-mentioned step 201 and stores it in the RAM 25.

FIG. 5 is an explanatory diagram of the types of a common part where components come into contact with each other, and in FIGS. 5(a) to 5(d), the common part is indicated with diagonal lines. Since FIG. 5(e) is an edge joint, the common part is indicated with a continuous line.

Figure 6:
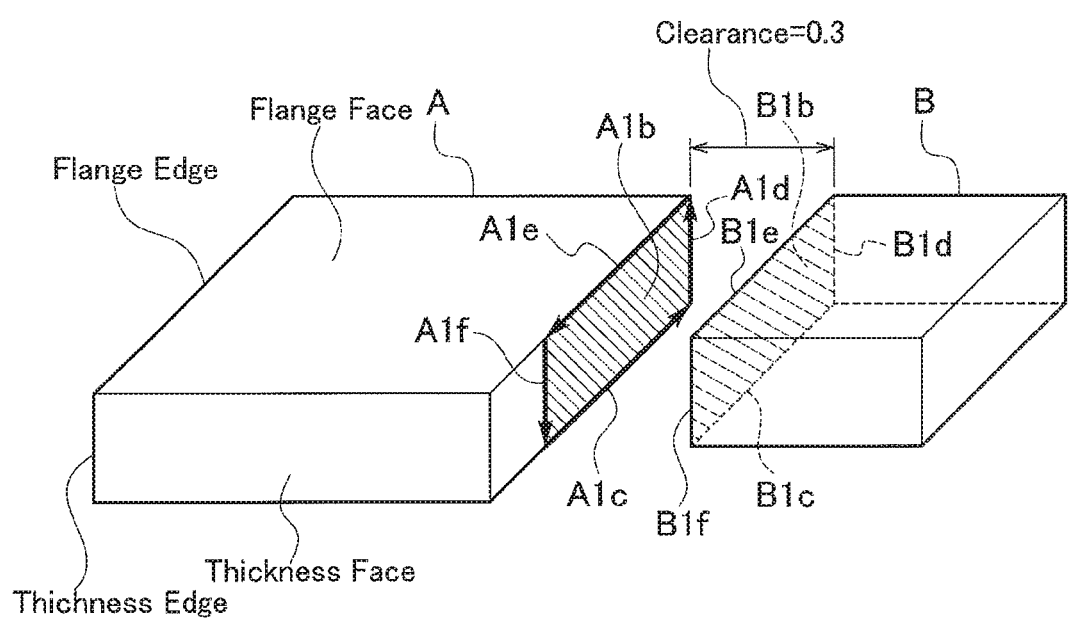
FIG. 6 is an explanatory diagram of a common face of a butt joint where an end face A1 of a component A and an end face B1 of a component B come into contact with each other.

Here, the butt joint as shown in FIG. 5(a) will be explained as an example. As shown in FIG. 6, the butt joint involves the end face A1 of the component A and the end face B1 of the component B that come into contact with each other to form a common face for which configuration information as shown in FIG. 7 is obtained.

The end face A1 of the component A shown in FIG. 6 is provided with a protective film.

Namely, a first edge A1c surrounding a common face A1b of the end face A1 of the component A and a first edge B1c surrounding a common face B1b of the end face B1 of the component B shown in FIG. 6 are obtained as a Local Edge ID=1 of a Butt Joint Feature shown in FIG. 7.

In the Local Edge ID=1, a parameter GeomAttr1 of the first edge A1c has an attribute Flange Edge and a parameter GeomAttr2 of the first edge B1c has an attribute Flange Edge.

Similarly, parameters and attributes of second edges A1d and B1d, third edges A1e and B1e, and fourth edges A1f and B1f, i.e., Local Edge ID=2 to Local Edge ID=4 are obtained as common-face configuration information as shown in FIG. 7. Based on these information pieces, the type of the common part is determined.

FIG. 6 is an explanatory diagram of the common face where the end face A1 of the component A and the end face B1 of the component B come into contact with each other and FIG. 7 is an explanatory diagram of the configuration information of the common face shown in FIG. 6.

Next, in a step 205, the CPU 27 of the control device 7 adds a laser marking processing process to the processing program according to the configuration information of the common part generated and stored in the RAM 25 in the step 203.

Namely, based on the above-mentioned configuration information of the common part, a process program of carrying out the laser marking processing along a periphery of the common part is added to the processing program.

The laser marking processing may be added to be carried out after regular laser processing or before the regular laser processing.

In the case of the common face shown in FIG. 6 where the end face A1 of the component A and the end face B1 of the component B come into contact with each other, the first edge A1c to the third edge A1e among the edges along the periphery of the common face are edges of the component A, and therefore, the laser marking processing is set to be carried out along the fourth edge A1f.

Also, in consideration of a fitting error of the components A and B, the laser marking processing may be carried out on slightly outside of the fourth edge A1f.

Next, concrete examples of the laser marking processing on a common part will be explained.

FIGS. 8 to 11 are explanatory diagrams of concrete examples of the laser marking processing on common parts.

Figure 8:
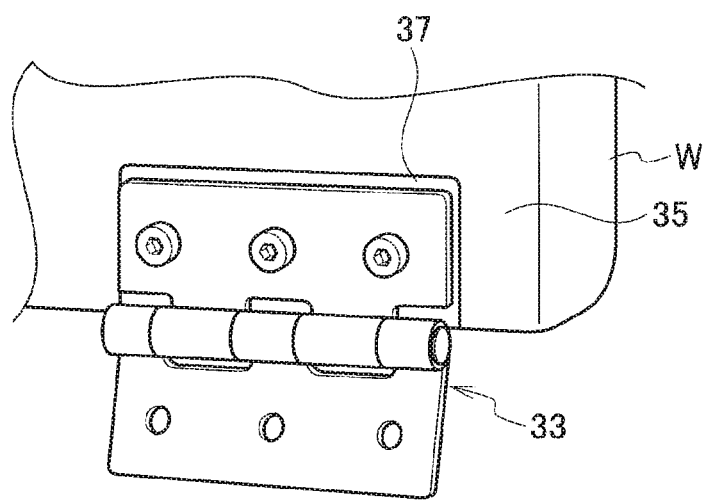
FIG. 8 is an explanatory diagram of laser marking processing of a butt joint to attach a separate component to a workpiece W.
Figure 8:
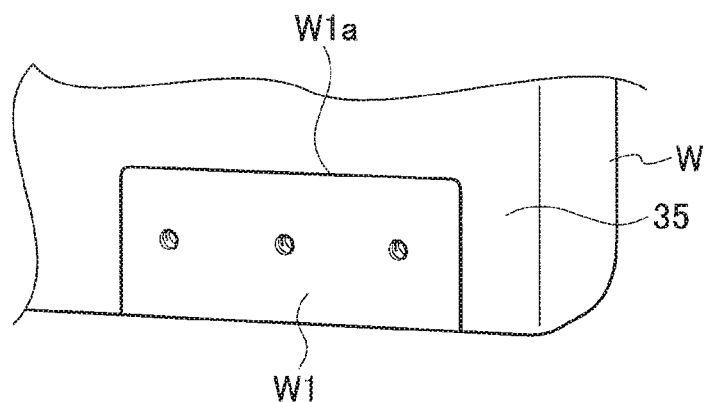

FIG. 8 is an explanatory diagram of a but joint having a common part to which another component is scheduled to be attached.

As shown in FIG. 8(a), in a processing process of a workpiece Wafter laser processing, a different component 33 is attached to the workpiece W. In this case, the control device 7 generates, from processing process information after laser processing of the workpiece W, configuration information of a common part where the different component is going to be attached, and based on the configuration information, the laser marking processing is added to a processing program. As a result, as shown in FIG. 8(b), the laser marking processing is carried out along a periphery W1a of the common part W1 where the different component 33 is scheduled to be attached.

With this, after laser processing, a protective film of the common part along which the laser marking processing was carried out can easily be removed, and as shown in FIG. 8(a), the different component 33 can be attached to the common part 37 from which the protective film 35 was removed.

Namely, it is possible to avoid trouble to be caused when the different component 33 is attached to a part where the protective film 35 is still attached.

Figure 9:
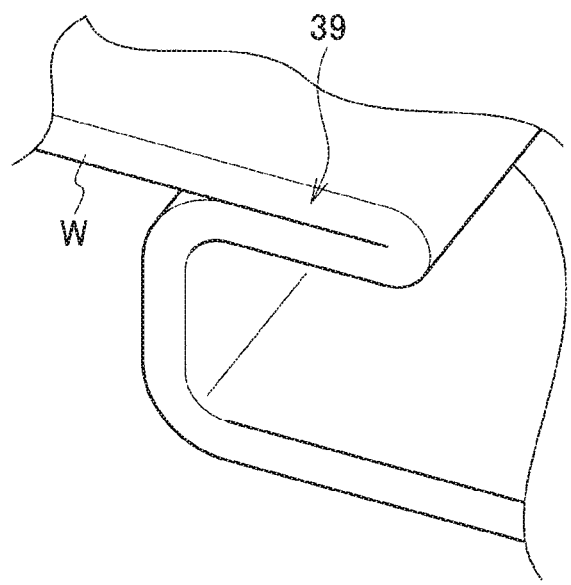
FIG. 9 is an explanatory diagram of laser marking processing of a butt joint having a common part where hemming (pressing) bending is carried out.
Figure 9:
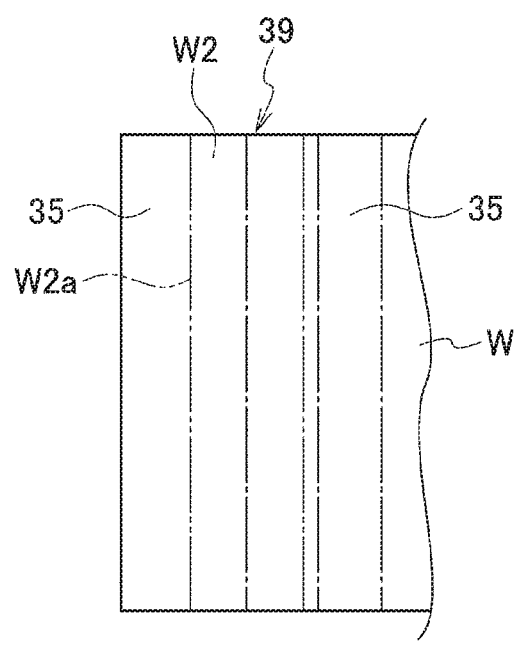

FIG. 9 is an explanatory diagram of a butt joint having a common part where hemming (pressing) bending is carried out.

As shown in FIG. 9(a), when there is a common part where hemming (pressing) bending is carried out, the control device 7 generates configuration information of the common part where the hemming (pressing) bending is scheduled to be carried out, and based on the configuration information, adds the laser marking processing to a processing program. As a result, as shown in FIG. 9(b), the laser marking processing is carried out along a periphery W2a of an overlapping area W2 of the common part 39 where the hemming (pressing) bending is carried out.

With this, after laser processing, a protective film of the common part where the laser marking processing was carried out can easily be removed, and as shown in FIG. 9(b), the hemming (pressing) bending can be carried out in a state that the protective film 35 was removed from the overlapping area W2.

Namely, it is possible to avoid trouble to be caused by the protective film 35 left on the common part 39 when the hemming (pressing) bending is carried out on the common part 39.

Figure 10:
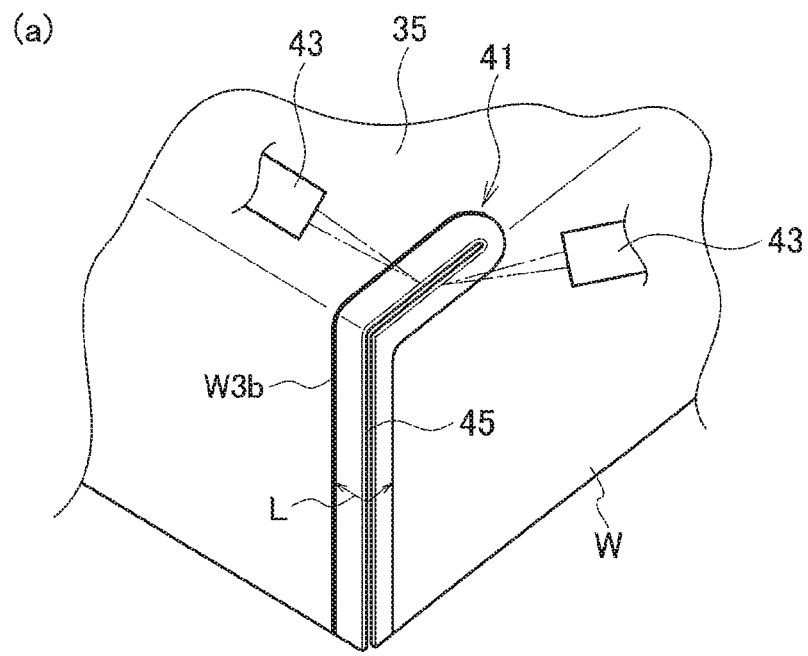
FIG. 10 is an explanatory diagram of an edge joint having a common part where edge welding is carried out.
Figure 10:
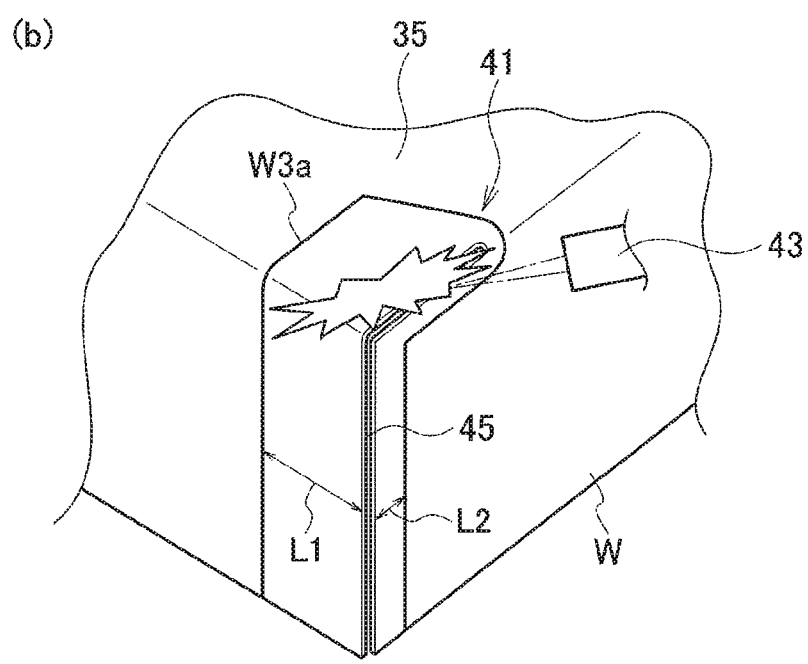

FIG. 10 is an explanatory diagram of an edge joint having a common part where edge welding is carried out.

As shown in FIG. 10(a), when there is a common part where edge welding is carried out, the control device 7 generates, from welding setting information, configuration information of the common part where welding is carried out, and based on the configuration information, adds the laser marking processing to a processing program. As a result, as shown in FIG. 10(b), the laser marking processing is carried out along a periphery W3a of the common part 41 where welding is carried out.

Here, determination of the periphery W3a of the common part 41 where welding is carried out is made according to a below-explained process of setting a removing width L of the protective film 35 on the part 41 where welding is carried out.

Namely, the process of setting a removing width of the protective film 35 on the common part 41 where welding is carried out includes that, when setting a welding operation based on the welding setting information, the control device 7 estimates a heat gain (directivity) from a welding head 43 and unevenly sets minimum removing widths L with respect to a weld line 45.

More precisely, as shown in FIG. 10(a), a heat diffusion quantity from the weld line 45 of the common part 41 where welding is carried out differs depending on an irradiation direction of the welding head 43 at the time of welding. As shown in FIG. 10(b), when the irradiation direction of a laser beam or the like from the welding head 43 is made incident to the right side of the weld line 45, a heat diffusion quantity on the left side of the weld line 45 will be greater than that on the right side of the weld line 45.

Accordingly, the control device 7 refers to the welding setting information, determines, as shown in FIG. 10(b), the periphery W3a of the common part 41 where welding is carried out such that a removing width L1 on the left side of the weld line 45 is greater than a removing width L2 on the right side of the weld line 45, and carries out the laser marking processing.

With this, it is possible, after laser processing, to easily remove the protective film of the common part where the laser marking processing was carried out, and as shown in FIG. 10(b), it is possible to remove the protective film 35 such that the removing width L1 on the left side of the weld line 45 is greater than the removing width L2 on the right side of the weld line 45. Therefore, the protective film 35 will never been burned nor leave a remnant.

It must be noted that the removing width L of the protective film 35 may be determined according to the plate thickness and material of a workpiece W. Namely, when the plate thickness and material of the workpiece W need a large amount of heat for welding, the removing width L may be set wider, and when only a small heat quantity is needed for welding, the removing width L may be set smaller.

Figure 11:
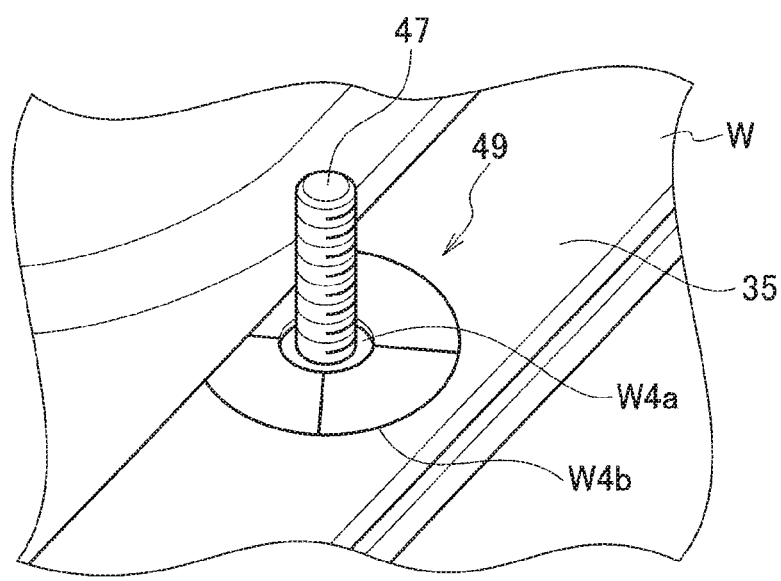
FIG. 11 is an explanatory diagram of laser marking processing of an end face joint having a common part where a stud bolt is attached by welding.

FIG. 11 is an explanatory diagram of a butt joint having a common part where a stud bolt is attached by welding.

As shown in FIG. 11, when there is a common part where a stud bolt is attached by welding, the control device 7 generates, from 3D model information, configuration information of the common part where the stud bolt 47 is attached by welding, and based on the configuration information, adds the laser marking processing to a processing program.

As a result, as shown in FIG. 11, the laser marking processing is carried out along a periphery W4a of the common part 49 where the stud bolt 47 is attached by welding.

With this, it is possible, after laser processing, to easily remove the protective film of the common part where the laser marking processing was carried out, and as shown in FIG. 11, it is possible to weld the stud bolt 47 in a state that the protective film 35 is removed from the periphery W4a of the common part 49 where the stud bolt 47 is attached by welding.

As a result, the protective film 35 will never been burned nor leave a remnant.

Further, in a determination process of the common part 49 where the stud bolt 47 is attached by welding, the control device 7 may estimate a heat gain (directivity) of a welding head and unevenly set minimum removing widths L with respect to the stud bolt 47.

Also, in FIG. 11, W4b is a mark to indicate a welding position of the stud bolt 47.

According to the above-mentioned embodiment, the laser marking processing is carried out in advance on a common part from which a protective film must be removed, to make the protective film easily removable, thereby remarkably improving the workability of common-part removal of the protective film.

The present invention is not limited to the above-mentioned embodiment, and through proper modifications, is achievable in other forms.

INDUSTRIAL APPLICABILITY

According to the present invention, when processing a workpiece attached with a protective film, the protective film to be removed from a common part is automatically determined and cut off to greatly improve the workability of common-part removal of the protective film.

The invention claimed is:

1. A method involving for processing a workpiece to which a protective film is attached, comprising:
  obtaining processing information including a processing program for processing the workpiece,
  determining that the processing information includes information about contacting a common part of the workpiece to a different component or a different part of the workpiece;
  adding to the processing program instructions for performing a laser processing process instructing laser cutting of the protective film with a laser on the common part of the workpiece before contacting the common part of the workpiece to the different component or the different part of the workpiece when it is determined that the processing information includes the information about contacting the common part of the workpiece to the different component or the different part of the workpiece;

cutting of the protective film with the laser on the common part of the workpiece after the adding to the processing program of instructions for performing the laser processing process; and contacting the common part of the workpiece to the different component or the different part of the workpiece after the cutting of the protective film.

2. The method according to claim 1, wherein the laser processing process to cut the protective film is laser marking processing.

3. The method according to claim 1, wherein the common part is a part to which another component is scheduled to be attached.

4. The method according to claim 1, wherein the common part is a part on which hemming bending is carried out.

5. The method according to claim 1, wherein the common part is a part on which welding is carried out.

6. The method according to claim 1, wherein the common part is a part to which a stud bolt is attached by welding.

7. The method according to claim 3, wherein the processing information includes, in addition to the processing program, information necessary for processing including the material, processing dimensions, and 3D model information of a workpiece to process, as well as processing process information after laser processing of the workpiece including welding setting and stud bolt attachment setting and information concerning the protective film attached to the workpiece, the information concerning the protective film including the type of the protective film.

8. The method according to claim 1, wherein when the common part that requires the laser processing to cut the protective film is a common part on which welding is carried out, the shape of the common part that requires the laser processing to cut the protective film is adjusted according to a heat diffusing range from a weld line.

9. The method according to claim 8, wherein when the common part that requires the laser processing to cut the protective film is a common part on which welding is carried out, the shape of the common part that requires the laser processing to cut the protective film is changed according to an irradiation direction of a laser beam from a welding head.

* * * * *